United States Patent [19]

Heald et al.

[11] 3,821,784

[45] June 28, 1974

[54] SWITCHING TRANSISTOR WITH MEMORY

[75] Inventors: David L. Heald, Santa Barbara; James W. Holm-Kennedy, Venice, both of Calif.

[73] Assignee: The Regents of the University of California, Berkeley, Calif.

[22] Filed: July 10, 1972

[21] Appl. No.: 270,553

[52] U.S. Cl. .................................. 357/63, 357/34

[51] Int. Cl. .......................................... H01l 11/06

[58] Field of Search. 317/235 WW, 235 AQ, 235 K, 317/234 V

[56] References Cited

UNITED STATES PATENTS

| | | | |
|---|---|---|---|
| 3,422,322 | 1/1969 | Haisty | 317/235 |
| 3,668,480 | 6/1972 | Chang et al. | 317/234 |

*Primary Examiner*—Jerry D. Craig

*Attorney, Agent, or Firm*—Lindenberg, Freilich & Wasserman

[57] ABSTRACT

A switching transistor with memory is provided in which a selected junction (preferably the base-emitter junction) is fabricated to have a high injection efficiency and multiple acceptor or multiple donor trapping centers distributed in and around the depletion region of the junction. The trapping centers are chosen to be of a type for field-induced trapping dominant carriers transported across the selected junction when forward biased. To switch the transistor from one I-V characteristic to a lower I-V characteristic, the selected junction is biased in a forward direction to a predetermined threshold level for field-induced trapping of said carriers by the distributed trapping centers, thereby creating a stable and stationary space charge domain in the current path of the selected junction. The transistor is reset by reverse biasing the selected junction to a level where the space charge domain is annihilated.

16 Claims, 6 Drawing Figures

STATE 1

STATE 2

SWITCHING TRANSISTOR WITH MEMORY

BACKGROUND OF THE INVENTION

This invention relates to transistors and more particularly to transistors which can be switched from one I-V characteristic or state to another significantly different state in response to an applied voltage, with retention of the state to which it has been switched for very long periods of time, and without any sustaining voltage being applied, until reset by an applied voltage.

In a copending application Ser. No. 270,552, now abandoned in favor of a continuation application Ser. No. 433,674, filed Jan. 16, 1974 filed concurrently herewith by James W. Holm-Kennedy, titled "Switching Diode With Memory," there is disclosed a new class of memory diodes which can be switched from a high conductivity state or voltage-current (I-V) characteristic to a low conductivity state in response to a forward bias voltage which exceeds a predetermined threshold. The diodes may be of any type having a nonformed rectifying junction, such as a point contact, Schottky or PN (or PIN) diode. The switching characteristic with memory relies upon deep multiple acceptors or multiple donors, and a forward bias voltage above a predetermined threshold level across the rectifying junction. The internal field created by the forward bias voltage causes field induced trapping (FIT) to form a stationary domain. The presence of the domain alters the space charge in the depletion region and thereby alters the current-voltage characteristic of the diode.

The diode junction is designed with high injection efficiency of FIT carriers, i.e., the diode is so designed that the injection efficiency of the carrier which is field-induced trapped is significantly larger than about 50 percent, and as close to 100 percent as is practical, to insure the creation of a stable space charge domain. The concentration of multiple donor or multiple acceptor deep impurities is made sufficiently large so that, when trapping does take place, a negative differential conductivity occurs causing a significant alteration of the space charge in the depletion region (i.e., domain creation). That concentration is determined empirically.

The diode can be switched from a basic or first I-V characteristic state to a second I-V characteristic state in response to an applied voltage, such as a forward bias voltage, and reset to the first state in response to a different applied voltage, such as reverse bias voltage. To determine the state of the diode, the diode is forwardly biased sufficiently for substantial current to be transported through the diode, but not enough to switch the diode, and the level of current is sensed. The current level in the second state of the diode will be significantly lower than for the first state.

The mechanism involved is briefly as follows. Multiple acceptor or multiple donor impurities are introduced into the semiconductor in and around the depletion region of the rectifying junction. The junction parameters are chosen to provide an injection efficiency sufficiently high to cause field-induced trapping (FIT) under a forward bias about a threshold level. This FIT creates a space charge domain in the vicinity of the junction, and the presence of the domain alters the I-V characteristic of the diode. Generally, the two states will be no domain for the basic I-V characteristic, and a significant domain for the second state. Evidently, every state in between is possible, and if the diode is properly designed, more than two states can be achieved, such as by designing the diode to be sufficiently slow in creating the domain as to be able to stop it at any size domain. An analog storage device is thuse provided wherein the domain size, and therefore the I-V characteristic is proportional to the time the setting voltage is applied to the diode. To reset the diode, the applied voltage can be reversed sufficiently to cause the domain to be annihilated via the Frenkel-Poole effect or impact ionization. The applied voltage could also be increased in the forward direction sufficiently for the domain to collapse through the normal recombination process.

For use in memory arrays, the diode would be designed and operated in such a manner as to provide switching from the basic I-V characteristic to another distinct I-V characteristic, or range of I-V characteristics, in as short a time as possible. This would imply a design for driving the diode as fast as possible into the forwardly biased condition where the most distinct (i.e., largest) domain is created, but not so far as to risk collapse of the domain. It would also be desirable to design the diode such that maximum current is quickly transported through the junction during readout.

SUMMARY OF THE INVENTION

In accordance with the present invention, a switching diode with memory of the type described in the aforesaid copending application is built into a selected junction of a transistor by designing that junction to have a sufficiently high injection efficiency of the carrier to be trapped to insure stable space charge domain formation and distributing selected trapping centers in the semiconductor in and around the depletion region of the selected junction, where the trapping centers are selected to be acceptors or donors having two or more ionization energy levels, whichever is appropriate to trap carriers being transported across the selected junction under forward bias.

The novel features that are considered characteristic of this invention are set forth with particularity in the appended claims. The invention will best be understood from the following description when read in connection with the accompanying drawings.

DESCRIPTION OF THE PREFERRED EMBODIMENTS

In order to utilize the field-induced trapping effect for switching with memory, i.e., for creating a stable and stationary domain in a rectifying junction as described in the aforementioned copending application, but in a transistor, that switching mechanism is incorporated in a selected junction of a transistor, such as the emitter-base junction. That selected junction may be a point contact, Schottky, or PN (or PIN) but preferably a diffused PN junction. A double diffused NPN transistor, in which the selected junction is the emitter-base junction, will be described by way of example, and not by way of limitation.

The double diffused NPN transistor is first fabricated with conventional planar processing technology. The substrate is $n—n^+$ epitaxial silicon with a doping level of about $5 \times 10^{15}$ phosphorous atoms/cm. The $p^+$ base predeposition is made at 950° C from $BBr_3$ source. The base is then diffused to a depth of about 3$\mu$m at 1,150° C with a resultant surface concentration of $10^{18}$ boron atoms/$cm^3$. The $n^+$ emitter predeposition is made also at 950° C from a $POCl_3$ source. The emitter is driven to about 1.5$\mu$m (1.5$\mu$m base width) with a resultant surface concentration of about $10^{21}$ phosphorous atoms/$cm^3$. The resulting transistor has a current gain ($\beta$) of about 500, with the emitter injection efficiency probably being the limiting factor. That injection efficiency is purposely made high to insure stable space charge domain formation by field-induced trapping.

A multiple acceptor (copper) is then introduced into the substrate in and around the emitter-base junction to provide the deep trapping sites. The deep trapping sites must be multiple donor or multiple acceptor centers so that field induced trapping can occur. The capture rate on the trapping sites must have a strong enough dependence on the electric field to cause a negative differential conductivity, as more fully described in the aforementioned patent application.

The concentration of the multiple acceptor (or donor) impurities, here the copper atoms, must be sufficiently large so that a negative differential conductivity will occur, thereby resulting in the creation of a space charge domain in the current path of the base emitter junction. The amount, $2 \times 10^{16}$ deep impurities/$cm^3$ in this example, is determined empirically and the concentration then controlled by diffusing the copper for 8 hours at a specified temperature, 760° for the example. The copper diffusion decreases the current gain by a factor of two. The breakdown characteristics and output impedance were both significantly reduced.

Figure 1:
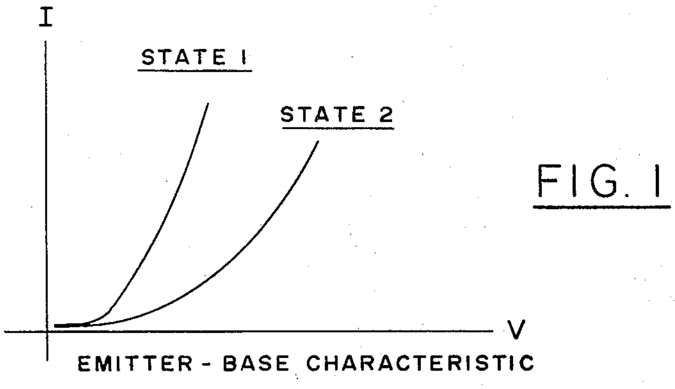
FIG. 1 illustrates current-voltage characteristic curves for the emitter-base junction in two stable conductivity states of a typical transistor in the array of FIG. 4.

This novel transistor can be operated in the same way as the diode with memory in the aforementioned copening patent application by simply considering the emitter-base junction as the diode with memory and biasing the other junction for cooperative operation of the two junctions as a transistor, i.e., and connecting the collector to a voltage source ($+V_{cc}$) through a current limiting resistor. The emitter-base junction has a basic I-V characteristic (state 1) and a second I-V characteristic (state 2) to which it can be switched, as shown in FIG. 1.

Figure 2:
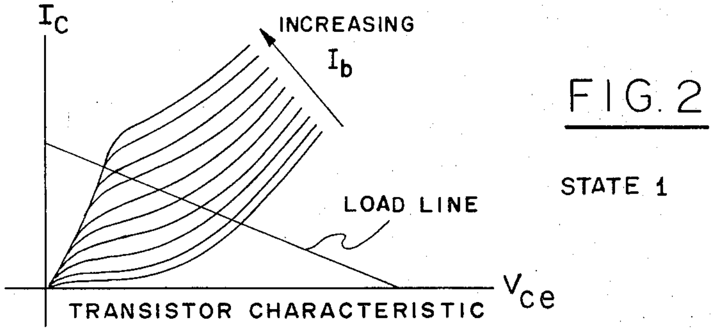
FIGS. 2 and 3 illustrate the transistor characteristics for the two emitter-base I-V characteristics shown in FIG. 1.
Figure 3:
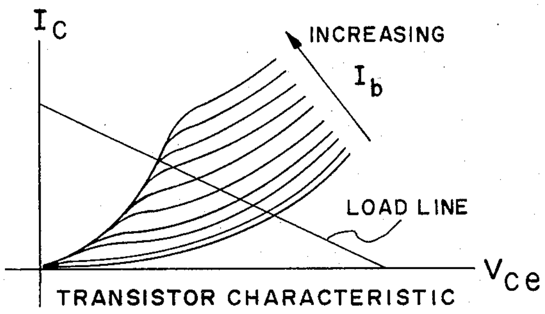

The forward current-voltage characteristic of the emitter-base junction for the two states are similar for biases less than 0.6 volts. High and low current states are evident above this point. The transistor characteristics for states 1 and 2 illustrated in FIGS. 2 and 3, respectively, show dissimilar saturation regions and output impedances. The beta is nearly identical for the two states indicating that the emitter injection efficiency is not radically altered by switching. Recombination apparently plays only a minor role in this regard. Additionally, the current-voltage characteristics of the emitter-base junction reveal a well defined "$n$" value of only 1.2 [$I = I_o (e^{qV/nkT} - 1)$] indicating surprisingly little recombination.

The two states of this novel transistor provides binary memory that is nonvolatile, i.e., will remain in either state without loss for at least many days in the absence of an applied voltage. The switching phenomenon is, as noted hereinbefore, believed to be associated with the multiple acceptor nature of the copper impurities with stationary space-charge domain formation as discussed in the aforementioned copending patent application. This new class of switching device appears to have significant potential as a new nonvolatile semiconductor memory element. In the transistor configuration, the current gain B of the transistor provides more carrier transportation through the emitter-base junction to provide faster creation of the domain, hence faster switching from state 1 to state 2 for a given voltage across the emitter-base junction.

Figures 4, 5:
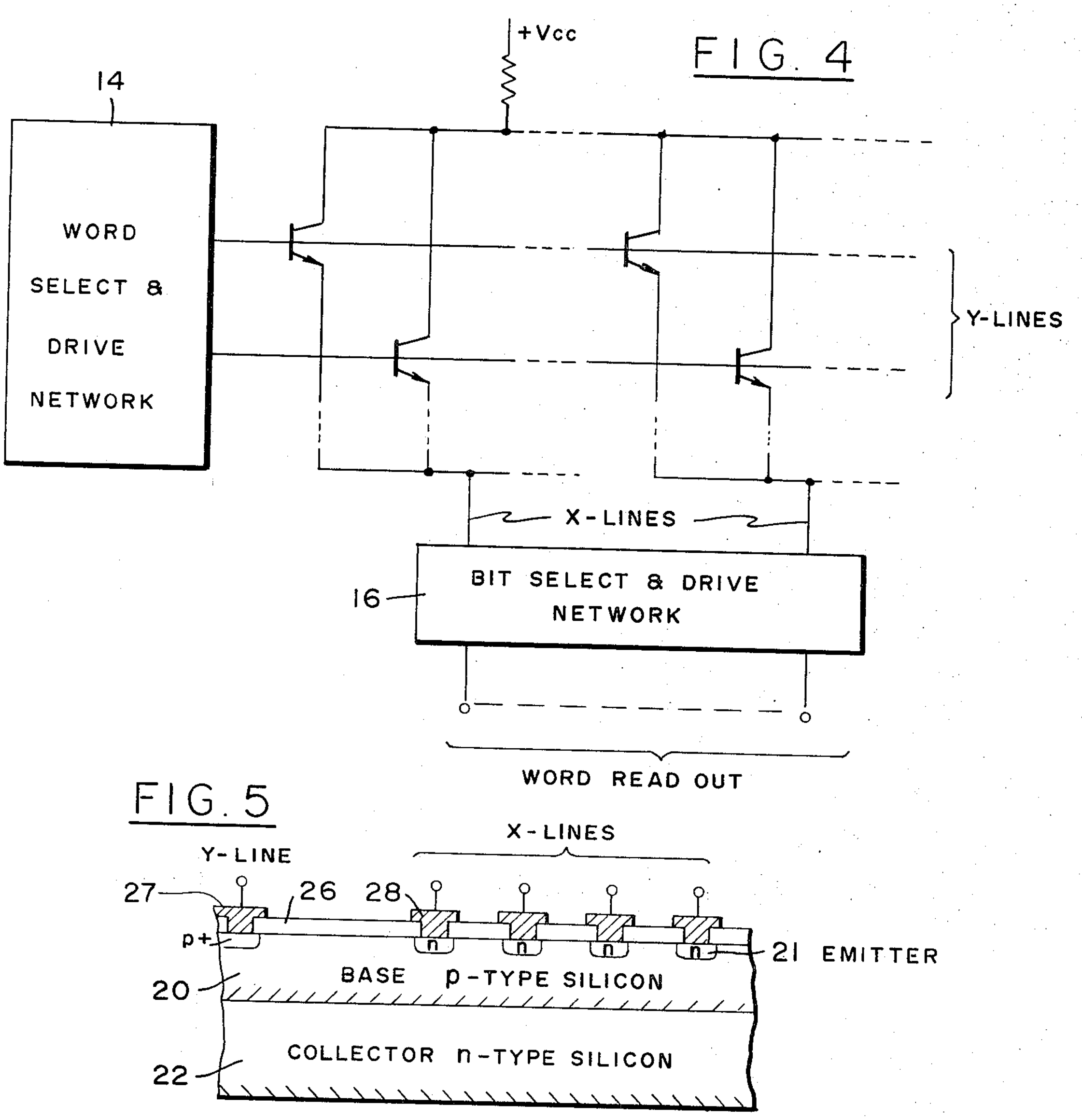
FIG. 4 illustrates a plurality of novel memory transistors in a word organized array.
FIG. 5 and 6 illustrate a cross-section and a top view of a transistor memory array, respectively.
Figure 6:
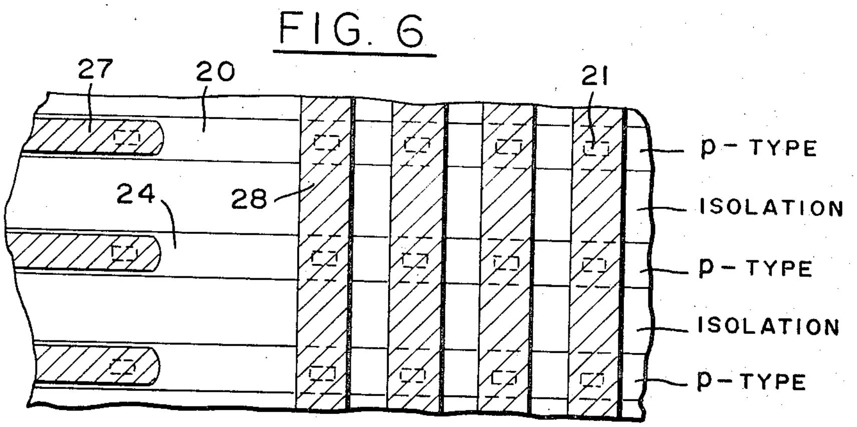

FIGS. 5 and 6 illustrate the simplicity with which the memory array of FIG. 4 can be fabricated. FIG. 5 is a sectional view showing a Y line connected to a base ($p$-type) 20 common to a plurality of emitters (n), such as an emitter 21. A common collector ($n$-type) 22 completes the row of NPN transistors. FIG. 5 shows in a plan view how the $p$-type base 20 for one row is isolated from $p$-type base 24 common to the next row of transistors and isolated from the first by a region 25 diffused with the same impurities as the collector which is common to all base regions. The $n$-type emitter regions are individually diffused in the several base regions to complete the rows of transistors having common base and collector regions, and unique emitter regions. The metallized conductors for the X and Y lines are provided by depositing aluminum over etched openings in an $SiO_2$ layer 26, such as the Y line 27 for the first row and the X line 28 for the first column. An $p^+$ region is diffused into the $p$-type base region 20 to provide an ohmic contact with the aluminum deposited for the Y line.

Although particular embodiments of the invention have been described and illustrated herein, it is recognized that modifications and variations may readily occur to those skilled in the art, such as using the collector-base junction for switching instead of the emitter-base junction, variations in materials and techniques for fabricating rectifying junctions for transistors in the various ways contemplated in the aforesaid copending application. It is therefore intended that the claims be interpreted to cover such modifications and variations in the fabrication of transistors in accordance with the present invention.

What is claimed is:

1. A transistor made of semi-conductive material, said transistor having an emitter-base junction and a collector-base junction, a selected one of said junctions having a high injection efficiency of carriers to be transported across said selected junction under forward bias; trapping centers in and around a depletion region of said selected junction, all said centers being selected to have multiple energy leavels of the same donor or acceptor type in said semiconductor material to trap said carriers transported through said selected junction in response to a forward bias voltage, said centers being present in a concentration sufficient to provide a stable space charge domain when field-induced trapping of said carriers by said trapping centers takes place in response to a forward bias voltage above a predetermined threshold level, said space charge domain being stationary and resulting in an alteration of the current-voltage characteristic of said transistor; means for biasing the unselected one of said junctions for cooperative operation of said junctions as a transistor; and means for selectively applying said forward bias voltage above said threshold level across said selected junction, whereby said transistor characteristic is switched from a first current-voltage characteristic to a second current-voltage characteristic in response to said domain creation.

2. A combination as defined in claim 1 including means for momentarily applying a resetting voltage across said selected junction to annihilate said domain, thereby selectively restoring said first current-voltage characteristic of said transistor.

3. A combination as defined in claim 2 wherein said means for applying said resetting voltage comprises means for reverse biasing said selected junction to a predetermined level required to annihilate said domain.

4. A combination as defined in claim 3 wherein said means for forward biasing said selected junction applies a voltage of an amplitude empirically selected to be sufficient to just create a domain that switches said transistor from said first current-voltage characteristic to said second current-voltage characteristic.

5. A transistor as defined in claim 4 wherein said selected junction is a diffused junction.

6. A transistor as defined in claim 4 wherein said selected junction is a Schottky barrier between a metal and said semiconductor.

7. A transistor as defined in claim 4 wherein said selected junction is comprised of a point contact junction.

8. A transistor as defined in claim 4 wherein said selected junction is comprised of a PIN junction having a high conductivity P region, a high conductivity N region, and in between said P and N regions a low conductivity region comprised of semi-conductor material undoped, lightly doped with *p*-type impurities, or lightly doped with n-type impurities, and wherein doping concentrations in said high conductivity P and N regions, and the thickness of said low conductivity region, are chosen to provide said internal field of said junction region in said semiconductor such that field induced trapping can occur under said forwardly biasing voltage, said field induced trapping resulting in a negative differential conductivity, thereby creating said domain.

9. A transistor having an emitter-base junction and a collector-base junction, said emitter-base junction having a high injection efficiency of carriers to be transported across said emitter-base junction under forward bias; trapping centers in and around a depletion region of said selected junction, all said centers being selected to have multiple energy levels of the same donor or acceptor type in said semiconductor material to trap said carriers transported through said emitter-base junction in response to a forward bias voltage, said centers being present in a concentration sufficient to provide a stable space charge domain when field-induced trapping of said carriers by said trapping centers takes place in response to a forward bias voltage above a predetermined threshold level, said space charge domain being stationary and resulting in an alteration of the current-voltage characteristic of said transistor; means for biasing said collector-base junction for cooperative operation of said junctions as a transistor; and means for selectively applying said forward bias voltage above said threshold level across said emitter-base junction, whereby said transistor characteristic is switched from a first current-voltage characteristic to a second current-voltage characteristic in response to said domain creation.

10. A transistor as defined in claim 9 including means for momentarily applying a resetting voltage across said emitter-base junction to annihilate said domain, thereby selectively restoring said first current-voltage characteristic of said transistor.

11. A transistor as defined in claim 10 wherein said means for applying said resetting voltage comprises means for reverse biasing said emitter-base junction to a predetermined level required to annihilate said domain.

12. A transistor as defined in claim 11 wherein said means for forward biasing said emitter-base junction applies a voltage of an amplitude empirically selected to be sufficient to just create a domain that switches said transistor from said first current-voltage characteristic to said second current-voltage characteristic.

13. A transistor as defined in claim 12 wherein said emitter-base junction is a diffused junction.

14. A transistor as defined in claim 12 wherein said emitter-base junction is a Schottky barrier between a metal and said semiconductor.

15. A transistor as defined in claim 12 wherein said emitter-base junction is comprised of a point contact junction.

16. A transistor as defined in claim 12 wherein said emitter-base junction is comprised of a PIN junction having a high conductivity P region, a high conductivity N region, and in between said P and N regions a low conductivity region comprised of semiconductor material undoped, lightly doped with *p*-type impurities, or lightly doped with *n*-type impurities, and wherein doping concentrations in said high conductivity P and N regions, and the thickness of said low conductivity region, are chosen to provide said internal field of said junction region in said semiconductor such that field induced trapping can occur under said forwardly biasing voltage, said field induced trapping resulting in a negative differential conductivity, thereby creating said domain.

* * * * *